(12) United States Patent
Goodger

(10) Patent No.: US 6,264,268 B1
(45) Date of Patent: Jul. 24, 2001

(54) CAR DOOR FRAME PROTECTING DEVICE

(76) Inventor: George A. R. Goodger, 1 Boundary Road, Ashford, Middlesex TW15 3LU (GB)

( * ) Notice: Subject to any disclaimer, the term of this patent is extended or adjusted under 35 U.S.C. 154(b) by 0 days.

(21) Appl. No.: 09/586,034

(22) Filed: Jun. 2, 2000

(51) Int. Cl.⁷ .................................................. B60R 13/02
(52) U.S. Cl. ......................... 296/199; 296/39.1; 280/770
(58) Field of Search .................................. 296/199, 209, 296/39.1; 280/770

(56) References Cited

U.S. PATENT DOCUMENTS

| | | | |
|---|---|---|---|
| D. 339,784 | 9/1993 | Reid et al. ........................... D12/167 |
| 2,281,586 | * 5/1942 | Kramer ................................. 296/1.1 |
| 4,355,842 | * 10/1982 | Hira ..................................... 296/199 |
| 4,493,506 | * 1/1985 | Alexander ........................... 296/209 |
| 4,607,878 | * 8/1986 | Itoh ..................................... 296/199 |
| 4,884,824 | 12/1989 | Radke ................................. 280/770 |
| 4,911,495 | * 3/1990 | Haga et al. .......................... 296/209 |
| 5,057,169 | 10/1991 | Adelman ................................. 156/71 |
| 5,129,678 | 7/1992 | Gurbacki .............................. 280/770 |
| 5,129,695 | 7/1992 | Norman, II ......................... 293/128 |
| 5,195,778 | 3/1993 | Dismuke ............................. 280/770 |
| 5,613,327 | * 3/1997 | Sauve ................................. 49/490.1 |
| 5,725,246 | 3/1998 | Zimmerman ........................ 280/770 |
| 5,820,201 | * 10/1998 | Jabalee ............................... 296/136 |
| 6,030,030 | * 2/2000 | Riddle et al. ........................ 296/209 |
| 6,196,623 | * 3/2001 | Shackelford et al. ............... 296/199 |

* cited by examiner

*Primary Examiner*—Joseph D. Pape
*Assistant Examiner*—Paul Chenevert

(57) ABSTRACT

A car doorframe protecting device for preventing impact damage to the sill portion of the car doorframe. The car doorframe protecting device includes a panel. The panel is elongate and has a generally planar top and bottom surface. The panel has a first edge, a second edge, a third edge and a fourth edge. The first and second edges are opposite edges and are generally orientated parallel to each other and a longitudinal axis of the panel. The panel has a substantially rectangular shape and comprises a flexible material. A fastening means fastens the panel to a car doorframe.

5 Claims, 2 Drawing Sheets

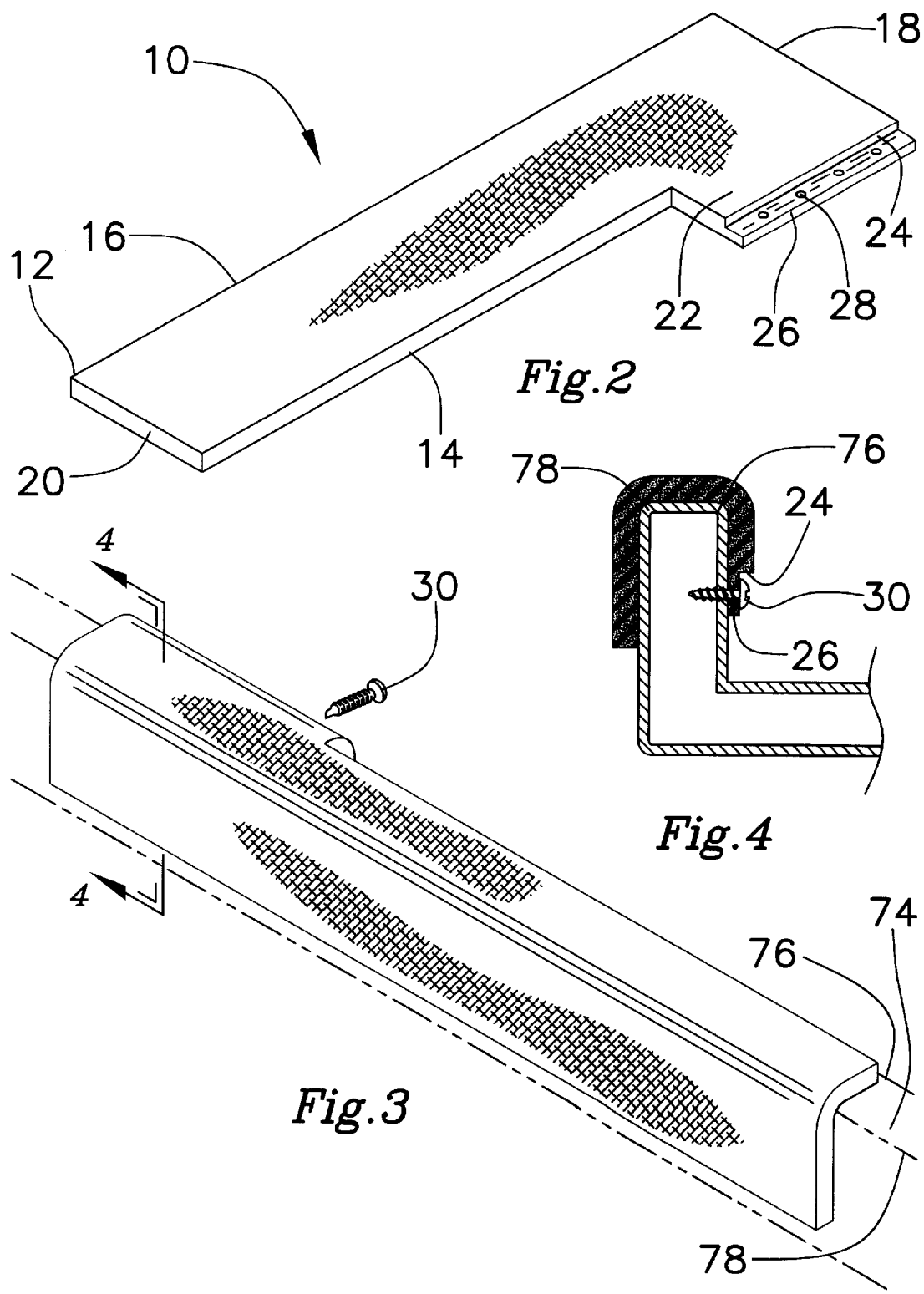

CAR DOOR FRAME PROTECTING DEVICE

BACKGROUND OF THE INVENTION

1. Field of the Invention

The present invention relates to car frame protecting devices and more particularly pertains to a new car doorframe protecting device for preventing impact damage to the sill portion of the car doorframe.

2. Description of the Prior Art

The use of car frame protecting devices is known in the prior art. More specifically, car frame protecting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,129,678; U.S. Pat. No. 5,129,695; U.S. Pat. No. 4,884,824; U.S. Pat. No. 5,057,169; U.S. Pat. No. 5,725,246; U.S. Pat. No. 5,195,778; and U.S. Des. Pat. No. 339,784.

While these devices fulfill their respective, particular objectives and requirements, the aforementioned patents do not disclose a new car doorframe protecting device. The inventive device includes a panel. The panel is elongate and has a generally planar top and bottom surface. The panel has a first edge, a second edge, a third edge and a fourth edge. The first and second edges are opposite edges and are generally orientated parallel to each other and a longitudinal axis of the panel. The panel has a substantially rectangular shape and comprises a flexible material. A fastening, means fastens the panel to a car doorframe.

In these respects, the car doorframe protecting device according to the present invention substantially departs from the conventional concepts and designs of the prior art, and in so doing provides an apparatus primarily developed for the purpose of preventing impact damage to the sill portion of the car doorframe.

SUMMARY OF THE INVENTION

In view of the foregoing disadvantages inherent in the known types of car frame protecting devices now present in the prior art, the present invention provides a new car doorframe protecting device construction wherein the same can be utilized for preventing impact damage to the sill portion of the car doorframe.

The general purpose of the present invention, which will be described subsequently in greater detail, is to provide a new car doorframe protecting device apparatus and method which has many of the advantages of the car frame protecting devices mentioned heretofore and many novel features that result in a new car doorframe protecting device which is not anticipated, rendered obvious, suggested, or even implied by any of the prior art car frame protecting devices, either alone or in any combination thereof.

To attain this, the present invention generally comprises a panel. The panel is elongate and has a generally planar top and bottom surface. The panel has a first edge, a second edge, a third edge and a fourth edge. The first and second edges are opposite edges and are generally orientated parallel to each other and a longitudinal axis of the panel. The panel has a substantially rectangular shape and comprises a flexible material. A fastening means fastens the panel to a car doorframe.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new car doorframe protecting device apparatus and method which has many of the advantages of the car frame protecting devices mentioned heretofore and many novel features that result in a new car doorframe protecting device which is not anticipated, rendered obvious, suggested, or even implied by any of the prior art car frame protecting devices, either alone or in any combination thereof.

It is another object of the present invention to provide a new car doorframe protecting device which may be easily and efficiently manufactured and marketed.

It is a further object of the present invention to provide a new car doorframe protecting device which is of a durable and reliable construction.

An even further object of the present invention is to provide a new car doorframe protecting device which is susceptible of a low cost of manufacture with regard to both materials and labor, and which accordingly is then susceptible of low prices of sale to the consuming public, thereby making such car doorframe protecting device economically available to the buying public.

Still yet another object of the present invention is to provide a new car doorframe protecting device which provides in the apparatuses and methods of the prior art some of the advantages thereof, while simultaneously overcoming some of the disadvantages normally associated therewith.

Still another object of the present invention is to provide a new car doorframe protecting device for preventing impact damage to the sill portion of the car doorframe.

Yet another object of the present invention is to provide a new car doorframe protecting device which includes a panel. The panel is elongate and has a generally planar top and bottom surface. The panel has a first edge, a second edge, a third edge and a fourth edge. The first and second edges are opposite edges and are generally orientated parallel to each other and a longitudinal axis of the panel. The panel has a substantially rectangular shape and comprises a flexible material. A fastening means fastens the panel to a car doorframe.

Still yet another object of the present invention is to provide a new car doorframe protecting device that is retrofittable on vehicles.

Even still another object of the present invention is to provide a new car doorframe protecting device that protects the doorframe from wheel chair damage and the like in an inexpensive manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic perspective view of the present invention.

FIG. 3 is a schematic perspective view of the present invention.

FIG. 4 is a schematic cross-sectional view taken along line 4—4 of the present invention.

DESCRIPTION OF THE PREFERRED EMBODIMENT

Figure 1:
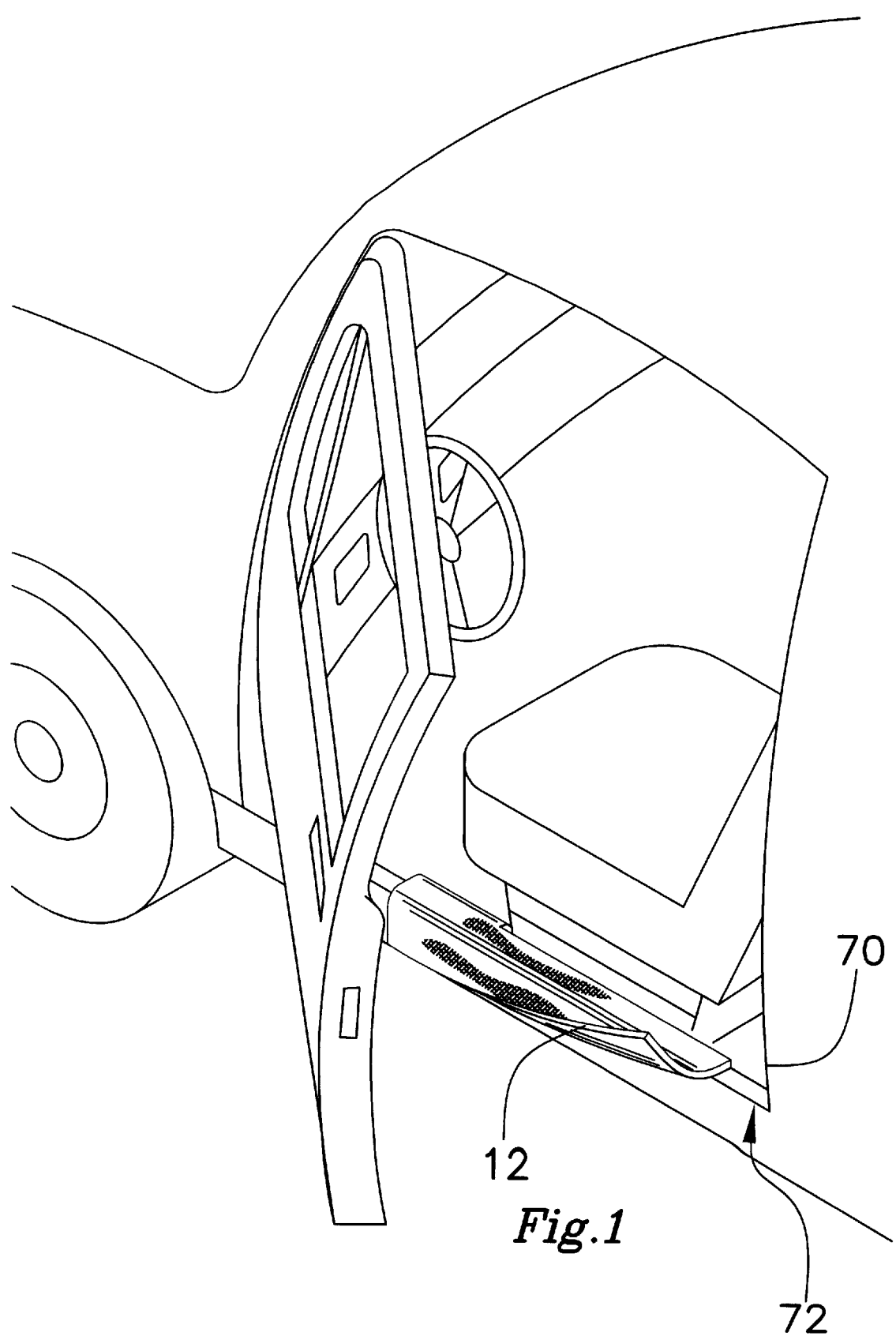
FIG. 1 is a schematic perspective in use view of a new car doorframe protecting device according to the present invention.

With reference now to the drawings, and in particular to FIGS. 1 through 4 thereof, a new car doorframe protecting device embodying the principles and concepts of the present invention and generally designated by the reference numeral 10 will be described.

As best illustrated in FIGS. 1 through 4, the car doorframe protecting device 10 generally comprises a panel. The panel 12 is elongate, and has a generally planar top and bottom surface. The panel 12 has a first edge 14, a second edge 16, a third edge 18 and a fourth edge 20, wherein the first 14 and second 16 edges are opposite edges and are generally orientated parallel to each other and a longitudinal axis of the panel 12. Preferably, the panel 12 has a length between 24 and 36 inches, a width between 4 and 10 inches and a height between ¼ and 1 inches. Ideally, the panel 12 has a length substantially equal to 30 inches, a width substantially equal to 6 inches and a height substantially equal to ½ inch. The panel 12 has a substantially rectangular shape. The panel comprises a flexible material which is preferably an elastomeric material.

A fastening means fastens the panel to the car doorframe. The fastening means includes a protruding portion 22. The protruding portion 22 is integrally coupled to and extends away from the first edge 14. The protruding portion 22 is positioned generally adjacent to the third edge 18 of the panel 12. Ideally, the protruding portion 22 has a length generally less than ½ the length of the first edge 14 and width substantially equal to ½ the width of the panel 12 and a height substantially equal to a height of the panel. The protruding portion 22 has a free edge 24 extending away from the panel 12. The protruding portion 22 comprises a flexible material. The flexible material preferably comprises an elastomeric material.

A flange 26 is integrally coupled to and extends away from the protruding portion. The flange generally lies in a plane of the free edge 24 of protruding portion 22. The flange 26 has a plurality of apertures 28 therein.

A plurality of securing means 30 secure the flange 26 to the car doorframe 70. Each of the securing means 30 extends through one of the apertures 28 and into the doorframe 70. Each of the securing means 30 comprising a screw.

In use, the panel 12 is positioned lengthwise on a top surface 74 of the bottom portion 72 of the car doorframe 70 such that the first edge 14 of the panel 12 is generally adjacent to the inside edge 76 of the top surface 74 such that the protruding portion 22 extends toward a floor portion of the car. The flange 26 is secured to the car doorframe 70 such that the second edge 16 of the panel 12 is positioned beyond the outer edge 78 and extends downwardly away from the car doorframe 70. The panel 12 protects the lower frame, or sill, from impact damage caused by wheelchairs and the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A car doorframe protecting device for protecting the surface of the bottom portion of a car doorframe from impact, the bottom portion having a top side bounded by an inside edge and an outside edge, said device comprising:

a panel, said panel being elongate, said panel having a generally planar top and bottom surface, said panel having a first edge, a second edge, a third edge and a fourth edge, wherein said first and second edges are opposite edges and are generally orientated parallel to each other and a longitudinal axis of said panel, said panel having a substantially rectangular shape, said panel comprising a flexible material; and a fastening means for fastening said panel to the car doorframe;

wherein said fastening means comprises:

a protruding portion integrally coupled to and extending away from said first edge of said panel, said protruding portion being positioned generally adjacent to said third edge of said panel, said protruding portion having a free edge;

a flange integrally coupled to and extending away from said protruding portion, said flange having a plurality of apertures therein;

a plurality of securing means for securing said flange to said car doorframe, each of said securing means extending through one of said apertures for extending into said doorframe;

wherein said protruding portion has a length generally less than ½ the length of said first edge and width substantially equal to ½ the width of said panel and a height substantially equal to a height of said panel.

2. The car doorframe protecting device as in claim 1, wherein said panel further comprises:

said panel having a length substantially between 24 inches and 36 inches, a width substantially between 4 inches and 10 inches and a height substantially between ¼ inch and 1 inch, said panel having a substantially rectangular shape.

3. A car doorframe protecting device for protecting the surface of the bottom portion of a car doorframe from impact, the bottom portion having a top side bounded by an inside edge and an outside edge, said device comprising:

a panel, said panel being elongate, said panel having a generally planar top and bottom surface, said panel having a first edge, a second edge, a third edge and a fourth edge, wherein said first and second edges are opposite edges and are generally orientated parallel to each other and a longitudinal axis of said panel, said panel having a length substantially equal to 30 inches, a width substantially equal to 6 inches and a height substantially equal to ½ inch, said panel having a substantially rectangular shape, said panel comprising a flexible material, said panel comprising an elastomeric material;

a fastening means for fastening said panel to the car doorframe, said fastening means comprising;

a protruding portion, said protruding portion being integrally coupled to and extending away from said first edge, said protruding portion being positioned generally adjacent to said third edge of said panel, said protruding portion having a length generally less than ½ the length of said first edge and width substantially equal to ½ the width of said panel and a height substantially equal to a height of said panel, said protruding portion having a free edge, said protruding portion comprising a flexible material, said flexible material comprising an elastomeric material;

a flange, said flange being integrally coupled to and extending away from said protruding portion, said flange generally lying in a plane of said protruding portion, said flange having a plurality of apertures therein;

a plurality of securing means for securing said flange to said car doorframe, each of said securing means extending through one of said apertures and into said doorframe, each of said securing means comprising a screw; and wherein said panel is positioned lengthwise on a top surface of said bottom portion of said car doorframe such that said first edge of said panel is generally adjacent to said inside edge such that said protruding portion extends toward a floor portion of said car, wherein said flange is secured to said car doorframe such that said second edge of said panel is positioned beyond the outer edge and extends downwardly away from the car doorframe.

4. A car doorframe protecting device for protecting the surface of the bottom portion of a car doorframe, the bottom portion having a top side bounded by an inside edge and an outside edge, said doorframe protecting device comprising:

an elongate panel having a generally planar top and bottom surface, said panel having a first side, a second side, a third side and a fourth side, said first and second sides being orientated generally parallel to each other and to a longitudinal axis of said panel, said panel comprising a flexible material; and a fastening means for fastening said panel to the car doorframe, said fastening means comprises:

a protruding portion extending from said first side of said panel, said protruding portion being positioned generally adjacent to said third side of said panel;

a flange extending away from said protruding portion, said flange having a plurality of apertures therein;

a plurality of fasteners for positioning through the plurality of apertures and mounting on the car doorframe;

wherein said protruding portion has a width substantially equal to one-half of a width of said panel.

5. The car doorframe protecting device as in claim 4, wherein said panel has a length measuring between approximately 24 inches and approximately 36 inches, a width measuring between approximately 4 inches and approximately 10 inches, and a height measuring between approximately one-quarter inch and approximately 1 inch.

* * * * *